US012613742B2

(12) United States Patent
Kim et al.

(10) Patent No.: US 12,613,742 B2
(45) Date of Patent: Apr. 28, 2026

(54) SYSTEM AND METHOD FOR DISTRIBUTED PROCESSING OF LARGE-SCALE STREAMING DATA

(71) Applicant: SAMSUNG ELECTRONICS CO., LTD., Suwon-si (KR)

(72) Inventors: Byeong Cheon Kim, Suwon-si (KR); Young Jae Kim, Suwon-si (KR); Kyoung Hoon Kang, Suwon-si (KR); Young Hak Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 566 days.

(21) Appl. No.: 18/099,592

(22) Filed: Jan. 20, 2023

(65) Prior Publication Data

US 2023/0393893 A1 Dec. 7, 2023

(30) Foreign Application Priority Data

Jun. 3, 2022 (KR) ........................ 10-2022-0068102

(51) Int. Cl.
*G06F 9/48* (2006.01)

(52) U.S. Cl.
CPC .................................. *G06F 9/4881* (2013.01)

(58) Field of Classification Search
CPC ................. G06F 16/901; G06F 9/4881; G06F 16/24568; G06F 9/5027
USPC ........................................................ 700/121
See application file for complete search history.

(56) References Cited

U.S. PATENT DOCUMENTS

| | | | |
|---|---|---|---|
| 9,553,836 B2 | 1/2017 | Addante et al. | |
| 10,789,544 B2 | 9/2020 | Fiedel et al. | |
| 2010/0217866 A1 | 8/2010 | Nandagopal et al. | |
| 2017/0286864 A1* | 10/2017 | Fiedel ..................... | G06F 9/546 |
| 2019/0007349 A1 | 1/2019 | Wang et al. | |
| 2019/0114533 A1* | 4/2019 | Ng .......................... | G06N 3/063 |
| 2019/0311300 A1* | 10/2019 | Lindner ................. | G06N 20/00 |
| 2021/0117729 A1* | 4/2021 | Bharti ................ | G01N 15/1429 |
| 2023/0137658 A1* | 5/2023 | Takahashi ............. | G06F 9/4881 |
| | | | 718/102 |

FOREIGN PATENT DOCUMENTS

| | | |
|---|---|---|
| KR | 10-2020-0054834 A | 5/2020 |
| KR | 10-2020-0069353 A | 6/2020 |

OTHER PUBLICATIONS

Brendan Burns et al., "Borg, Omega, and Kubernetes", system evolution, acmqueue, Jan.-Feb. 2016, (24 total pages).

* cited by examiner

*Primary Examiner* — Chun Cao
(74) *Attorney, Agent, or Firm* — Sughrue Mion, PLLC

(57) ABSTRACT

Provided is a system for distributed processing of data that includes a data storage storing raw data generated in a fabrication process in real time; a database storing information associated with each of the raw data in real time; a master service that monitors the database on the basis of the information, selects processing targets to be processed among the raw data, and stores metadata associated with the processing targets in a queue; and a plurality of pods which make requests for jobs to the master service, receive metadata from the master service, access the raw data stored in the data storage using the received metadata, and perform the jobs on the raw data.

20 Claims, 9 Drawing Sheets

FIG. 3

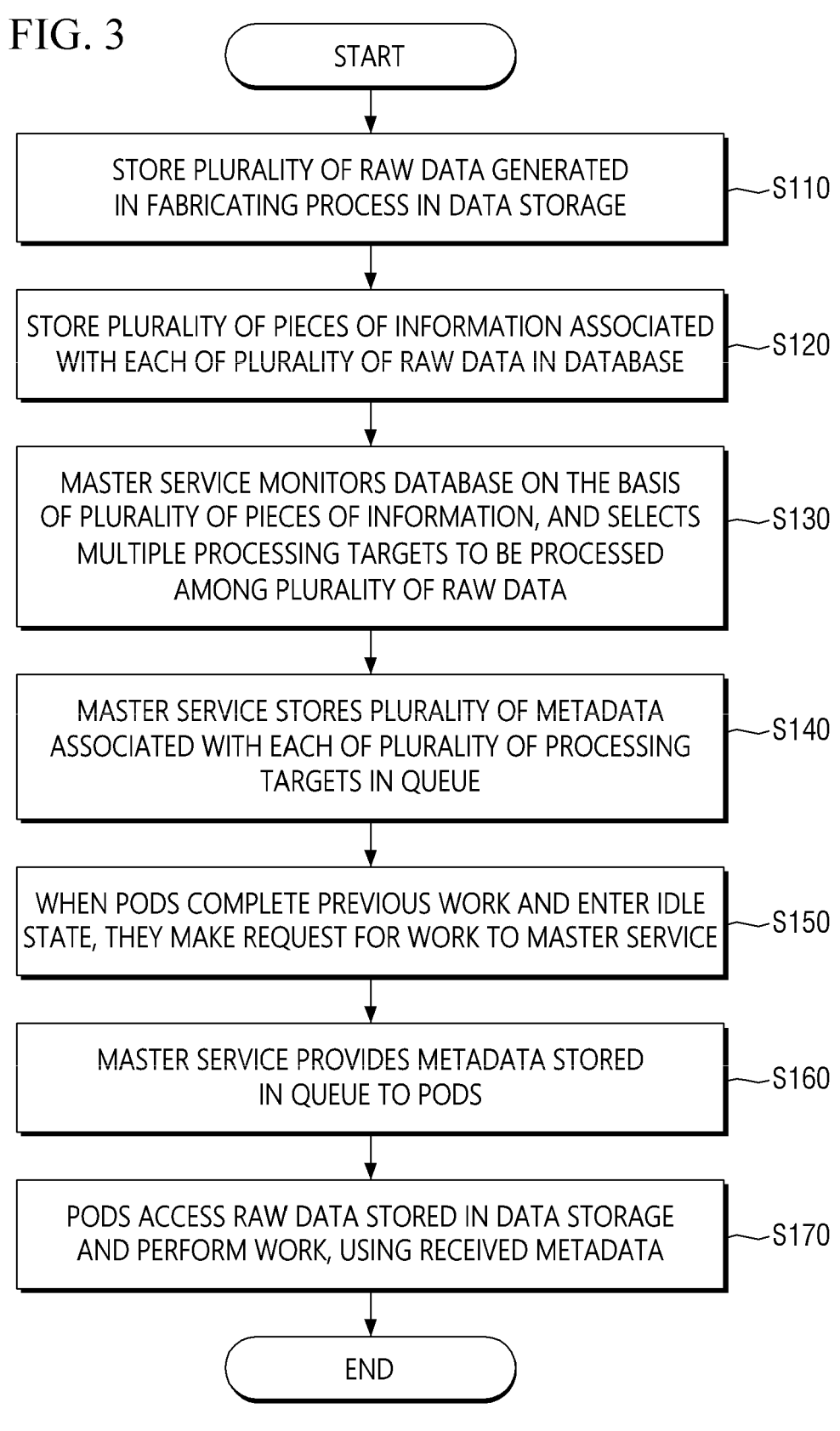

START

STORE PLURALITY OF RAW DATA GENERATED
IN FABRICATING PROCESS IN DATA STORAGE     ~S110

STORE PLURALITY OF PIECES OF INFORMATION ASSOCIATED
WITH EACH OF PLURALITY OF RAW DATA IN DATABASE     ~S120

MASTER SERVICE MONITORS DATABASE ON THE BASIS
OF PLURALITY OF PIECES OF INFORMATION, AND SELECTS
MULTIPLE PROCESSING TARGETS TO BE PROCESSED
AMONG PLURALITY OF RAW DATA     ~S130

MASTER SERVICE STORES PLURALITY OF METADATA
ASSOCIATED WITH EACH OF PLURALITY OF PROCESSING
TARGETS IN QUEUE     ~S140

WHEN PODS COMPLETE PREVIOUS WORK AND ENTER IDLE
STATE, THEY MAKE REQUEST FOR WORK TO MASTER SERVICE     ~S150

MASTER SERVICE PROVIDES METADATA STORED
IN QUEUE TO PODS     ~S160

PODS ACCESS RAW DATA STORED IN DATA STORAGE
AND PERFORM WORK, USING RECEIVED METADATA     ~S170

END

SYSTEM AND METHOD FOR DISTRIBUTED PROCESSING OF LARGE-SCALE STREAMING DATA

CROSS-REFERENCE TO RELATED APPLICATION

This application is based on and claims priority under 35 U.S.C. 119 to Korean Patent Application No. 10-2022-0068102, filed on Jun. 3, 2022 in the Korean Intellectual Property Office, the disclosure of which is incorporated by reference herein in its entirety.

BACKGROUND

1. Field

The disclosure relates to a system and method for distributed processing of large-scale streaming data.

2. Description of Related Art

Large-scale fabrication data is generated in a fabrication process of a semiconductor chip. Computing resources need to be significantly increased to process such large-scale fabrication data in real time using machine learning. However, since the increase in computing resources is costly, there is a need for a system that may maximize data processing efficiency of pods with limited resources.

SUMMARY

Aspects of the disclosure provide systems and methods for distributed processing of data capable of maximizing data processing efficiency.

According various embodiments of the disclosure, a system for distributed processing of data includes: a data storage configured to store a plurality of raw data generated in a fabrication process in real time; a database configured to store a plurality of pieces of information associated with the plurality of raw data in real time; a master service configured to monitor the database, select a plurality of processing targets to be processed among the plurality of raw data based on the plurality of pieces of information, and store a plurality of metadata associated with the plurality of processing targets in a queue; and a plurality of pods, each pod configured to make a request for a job to the master service, receive metadata from the master service corresponding to a processing target in the queue, access raw data among the plurality of raw data in the data storage using the received metadata, and perform the job on the raw data.

According various embodiments of the disclosure, a system for distributed processing of data includes: a data storage configured to store a plurality of image data generated in a fabrication process in real time; a database configured to store a plurality of pieces of information associated with the plurality of image data in real time; a master service configured to monitor the database at a preset time, detect a newly generated information after a previous monitoring time, select image data corresponding to the newly generated information as a processing target, and store metadata associated with the processing target in a queue; and a plurality of pods, each pod configured to operate in a keep-alive state in which a connection with the master service is kept alive. Each pod may be configured to make a request for a job to the master service and receive the metadata from the master service, based on completing a previous job and entering an idle state. Each pod may be configured to access the image data stored in the data storage, using the received metadata, and to perform a job on the image data for determining whether there is an abnormal measurement, using a machine learning model.

According various embodiments of the disclosure, a method for distributed processing of data includes: storing a plurality of raw data generated in a fabrication process, in a data storage in real time; storing a plurality of pieces of information associated with the plurality of raw data in a database in real time; selecting a plurality of processing targets to be processed among the plurality of raw data, based on the plurality of pieces of information; storing metadata associated with each of the plurality of processing targets in a queue; receiving a request for a job from a pod, based on the pod having completed a previous job and an idle state; and providing the metadata stored in the queue to the pod to perform the job based on accessing the corresponding plurality of processing targets in the data storage.

BRIEF DESCRIPTION OF DRAWINGS

The above and other aspects and features of the disclosure will become more apparent by describing in detail exemplary embodiments thereof with reference to the attached drawings, in which:

FIG. 3 is a flow chart explaining a method for distributed processing of data according to some embodiments of the disclosure;

FIG. 4 is a diagram for explaining operation S130 of FIG. 3 according to some embodiments of the disclosure;

FIG. 8 is a block diagram for explaining a system for distributed processing of data according to some embodiments of the disclosure;

DETAILED DESCRIPTION

Figure 1:
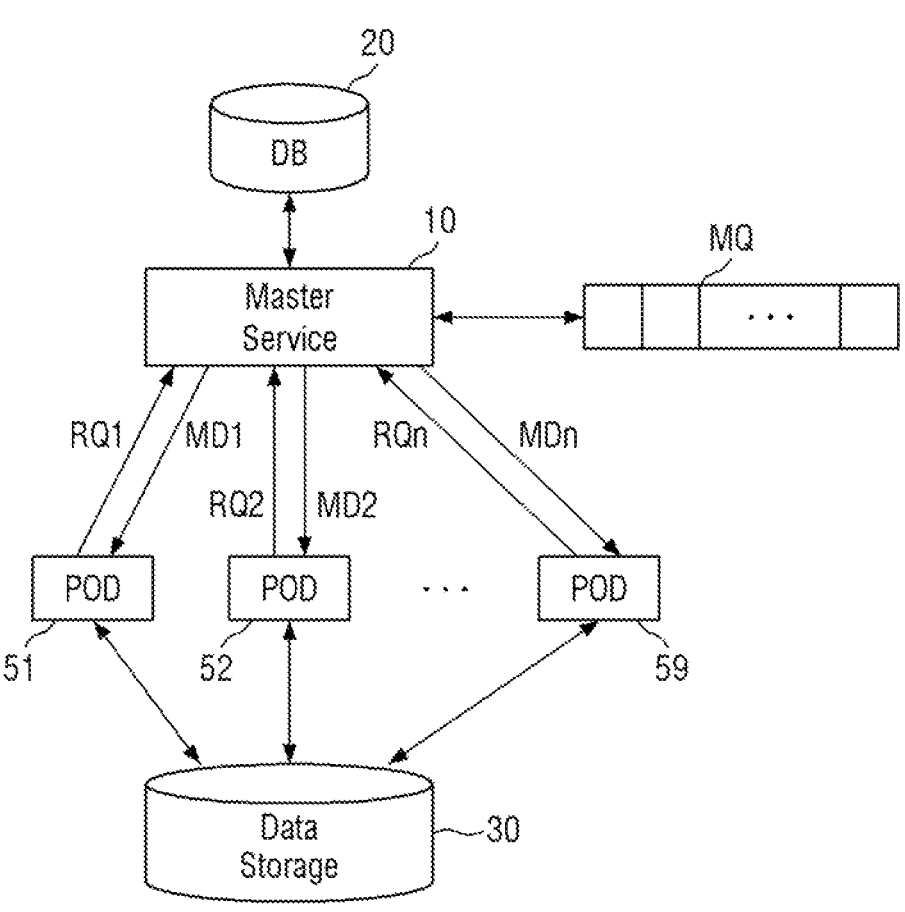
FIG. 1 is a diagram for explaining a system for distributed processing of data according to some embodiments of the disclosure.

Embodiments of the disclosure are described in detail below with reference to the accompanying drawings. The same reference numerals are used for the same components on the drawings, and repeated descriptions thereof will not be provided.

Figure 2:
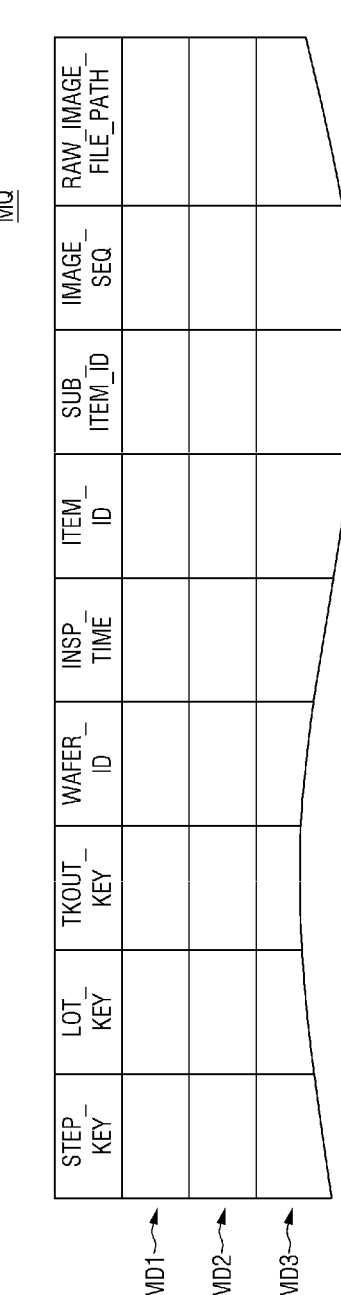
FIG. 2 is a diagram for explaining a queue shown in FIG. 1 according to some embodiments of the disclosure.

FIG. 1 is a diagram for explaining a system for distributed processing of data according to some embodiments of the disclosure. FIG. 2 is a diagram for explaining a queue shown in FIG. 1 according to some embodiments of the disclosure.

Referring to FIG. 1, the system for distributed processing of data according to some embodiments of the disclosure includes a data storage 30, a database 20, a master service 10, a plurality of pods such as pods 51, 52, 53, 54, 55, 56, 57, 58 and 59, a queue MQ, and the like.

The data storage 30 may store a plurality of raw data generated in a semiconductor fabrication process in real time. The plurality of raw data may include, but is not limited to, image data measured in the fabrication process.

Additionally, the plurality of raw data may be generated, for example, as measurement/inspection results, structural analysis results, and other imaging results. The measurement/inspection includes, for example, a critical dimension (CD) and/or photoresist slope measurement when performing an after development inspection (ADI) and an after cleaning inspection (ACI), a CD measurement/good determination when performing a focus exposure-time matrix (FEM), an auto visual inspection (AVI) of package/wafer, and the like. The structural analysis includes, for example, structural/defect measurement through a vertical scanning electron microscope (VSEM), structural measurement of a transmission electron microscope (TEM), structural measurement of a statistical and precise analysis using SEM (SPAS), and the like. Other imaging may include a process equipment inspection (e.g., a CMP apparatus, apparatus cleaning apparatus), a wafer exterior inspection (e.g., exterior/defect detection of pad/cell), a photoresist nozzle defect detection (e.g., a photo apparatus), a wafer surface detection (e.g., spin coater defect detection), a haze map, a mask imaging after defect repair of mask, and the like.

A plurality of raw data are stored in the data storage 30 in real time as each raw data is generated in the fabrication process. Although the plurality of raw data may be generated uniformly over time (or according to a regular cycle), the raw data may be generated non-uniformly or only when an event occurs.

The database 20 stores a plurality of pieces of information associated with each of the plurality of raw data generated in real time. Each piece of information may correspond to one or more of the plurality of raw data, and each piece of information may include metadata about the one or more raw data. Each piece of information may include, for example, an operation at which the one or more raw data is generated, a lot number, a tracked-out time, a substrate identifier (ID), an inspection time, an inspection type, a number of the one or more raw data, a storage position of the one or more raw data in the data storage and the like. According to embodiments, the database 20 and the data storage 30 may each be formed of one or more non-volatile memory modules and/or volatile memory modules, and/or one or more software modules residing in the memory modules.

The master service 10 monitors the database 20 on the basis of the plurality of pieces of information, and selects the plurality of processing targets to be processed among the plurality of raw data. For example, the master service 10 may search the plurality of pieces of information for each set time (or for each cycle). The master service 10 senses newly generated information even after the previous cycle (or previous monitoring time). The raw data corresponding to the newly generated information may be selected as the processing target. According to embodiments, the master service 10 may be physically implemented by analog or digital circuits such as logic gates, integrated circuits, microprocessors, microcontrollers, memory circuits, passive electronic components, active electronic components, optical components, hardwired circuits, or the like, and may be driven by firmware and software.

Raw data corresponding to all kinds of information newly generated after the previous monitoring time may be selected as the processing target, or raw data that satisfies certain conditions among the information newly generated after the previous cycle may be selected as the processing target.

Next, the master service 10 stores a plurality of metadata associated with each of the plurality of selected processing targets in the queue MQ. That is, the master service 10 stores the metadata corresponding to the selected processing target in the queue MQ, without immediately allocating a job associated with the selected processing target to one or more of the pods 51-59.

The metadata stored in the queue MQ may be the same as or different from the information (e.g., the plurality of pieces of information) stored in the database 20. That is, the master service 10 may read the information stored in the database 20, and store the information in the queue MQ as the metadata. Alternatively, the master service 10 may generate metadata based on the information stored in the database 20 and store the generated metadata in the queue MQ. For example, the master service 10 may read the information stored in the database 20, generate metadata based on only a part of the read information, and store the generated metadata in the queue MQ.

Referring to FIG. 2, a plurality of pieces of metadata (MD1-MDn) are stored in the queue MQ. For convenience of illustration, the contents described in the row in the queue MQ will be omitted. Each piece of metadata may correspond to one or more of the plurality of raw data (e.g., image data), and each piece of metadata may include an operation (STEP_KEY) in which the one or more image data is generated, a lot number (LOT_KEY), a tracked-out time (TKOUT_KEY), a substrate ID (WAFER_ID), an inspection time (INSP_TIME), an inspection type (ITEM ID, SUB ITEM ID), a number of the one or more image data (IMAGE_SEQ), a storage position of the one or more image data (RAW_IMAGE_FILE_PATH) in the data storage 30, and the like.

Referring to FIG. 1 again, the plurality of pods 51-59 may make requests for jobs (RQ1-RQn) to the master service 10 and receive the metadata (MD1-MDn) from the master service 10. That is, the plurality of pods 51-59 not only passively receive and process jobs from the master service 10, but also actively make the requests for jobs (RQ1-RQn). Each of the plurality of pods 51-59 may make a request for a job (RQ1-RQn) to the master service 10, when a previous job is completed and an idle state occurs.

Each of the plurality of pods 51-59 may access the raw data stored in the data storage 30 using the received metadata (MD1-MDn) and performs a job on the raw data.

For example, if the raw data is image data measured in the fabrication process, each of the plurality of pods 51-59 may perform a job to determine whether the image data stored in the data storage 30 belongs to a normal specification, using a machine learning model. If the image data does not correspond to the normal specification, each of the plurality of pods 51-59 may determine whether an abnormal measurement occurs.

A determination as to whether the abnormal measurement occurs may include determining whether the image data is generated by the abnormal measurement, or whether the image data is generated by a normal measurement but deviates from a normal specification. The determination that the image data is generated by the abnormal measurement may indicate an error in the measuring apparatus, an error in the measuring method, that the measuring apparatus is normal but that there is a problem with the measurement conditions, and the like.

A deep learning inference may be used as the machine learning model. For example, the deep learning inference may include, but is not limited to, a convolution neural network (CNN), a recurrent neural network (RNN), a generative adversarial network (GAN), a reinforcement learning (RL), and the like.

Each of the plurality of pods 51-59 may store a result of the determination as to whether the abnormal measurement occurs in the database 20, by updating information (e.g., the plurality of pieces of information) corresponding to the raw data.

Moreover, each of the plurality of pods 51-59 may be formed by a plurality of cores and memories including software implementing the function of the pods 51-59 described herein, but is not limited thereto.

When the master service 10 receives a request for a job from one or more of the pods 51-59, the master service 10 may provide metadata (MD1-MDn) of preset batch sizes to the one or more pods that make the request for the job.

When the batch size increases, the size of the memory used by the pods 51-59 increases, and the processing time may decrease. Incidentally, as the batch size increases, the size of the memory to be used increases linearly. However, when the batch size becomes a specific number (e.g., sixteen) or more, the decrease in processing time is small. Accordingly, if the master service 10 allocates a specific number (e.g., sixteen) of metadata (MD1-MDn) when allocating a job to each of the pods 51-59, the processing time may be reduced, while maximizing the CPU utilization efficiency.

In some implementations, one or more of the plurality of pods 51-59 may operate in a keep-alive state of keeping a connection with the master service 10 alive. In the related art, when a master service has external factors such as a pod operating in the keep-alive state, then the idle time of the pod may significantly increase. For example, when a master service creates a TCP connection with a pod operating in the keep-alive state, the TCP connection is kept alive continuously, and the master service may fail to properly perform load balancing because the master service may continuously grant jobs to pods in the keep-alive state, and may fail to grant jobs to other pods in an idle state. However, if the keep-alive state is not used, there is a need to make a new TCP connection each time the master service connects to a pod, which takes a lot of time and may cause a bottleneck.

On the other hand, various embodiments of the disclosure provide for distributed processing of data, where each of the plurality of pods 51-59 knows the IP of the master service 10 and may keep its connection with the master service 10. Since both the plurality of pods 51-59 and the master service 10 are in the keep-alive state, requests for jobs (RQ1-RQn) and metadata allocation (MD1-MDn) may be performed quickly, and it does not take much time to perform the TCP connection.

In summary, the fabrication process is complicated, and the amount of raw data generated increases exponentially with the increase in inspection/analysis targets. That is, large-scale streaming data is generated, and there is a need to efficiently use limited computing resources to process the large-scale streaming data. According to the system for distributed processing of data according to some embodiments of the disclosure, when one or more of the plurality of pods 51-59 make requests for jobs (RQ1-RQn), the master service 10 allocates the metadata (MD1-MDn) to the one or more pods 51-59 that make the request for the job. Such a type may improve the processing efficiency of large-scale streaming data compared to a type in which a master service allocates the jobs to the idle pods, while monitoring the multiple pods. Moreover, the embodiments may exhibit higher efficiency when the data is generated non-uniformly. By loading the metadata corresponding to the raw data generated unevenly into the queue MQ and evenly distributing it to the pods 51-59 when there is a request, it is possible to remove the bottleneck phenomenon due to the generation balance of the raw data.

Hereinafter, a method for distributed processing of data according to some embodiments of the disclosure will be described with reference to FIGS. 1 to 6.

Figure 4:
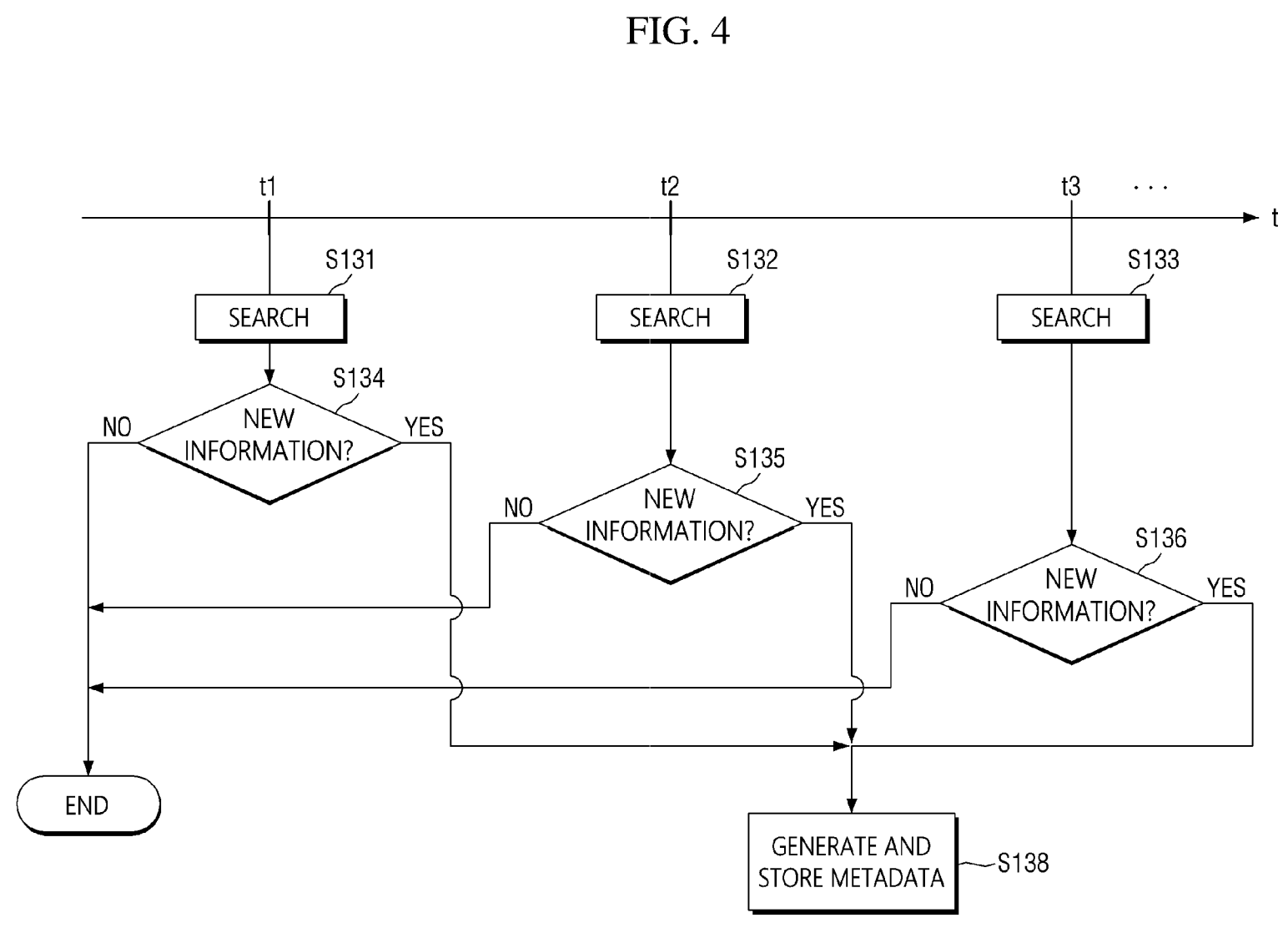
Figure 5:
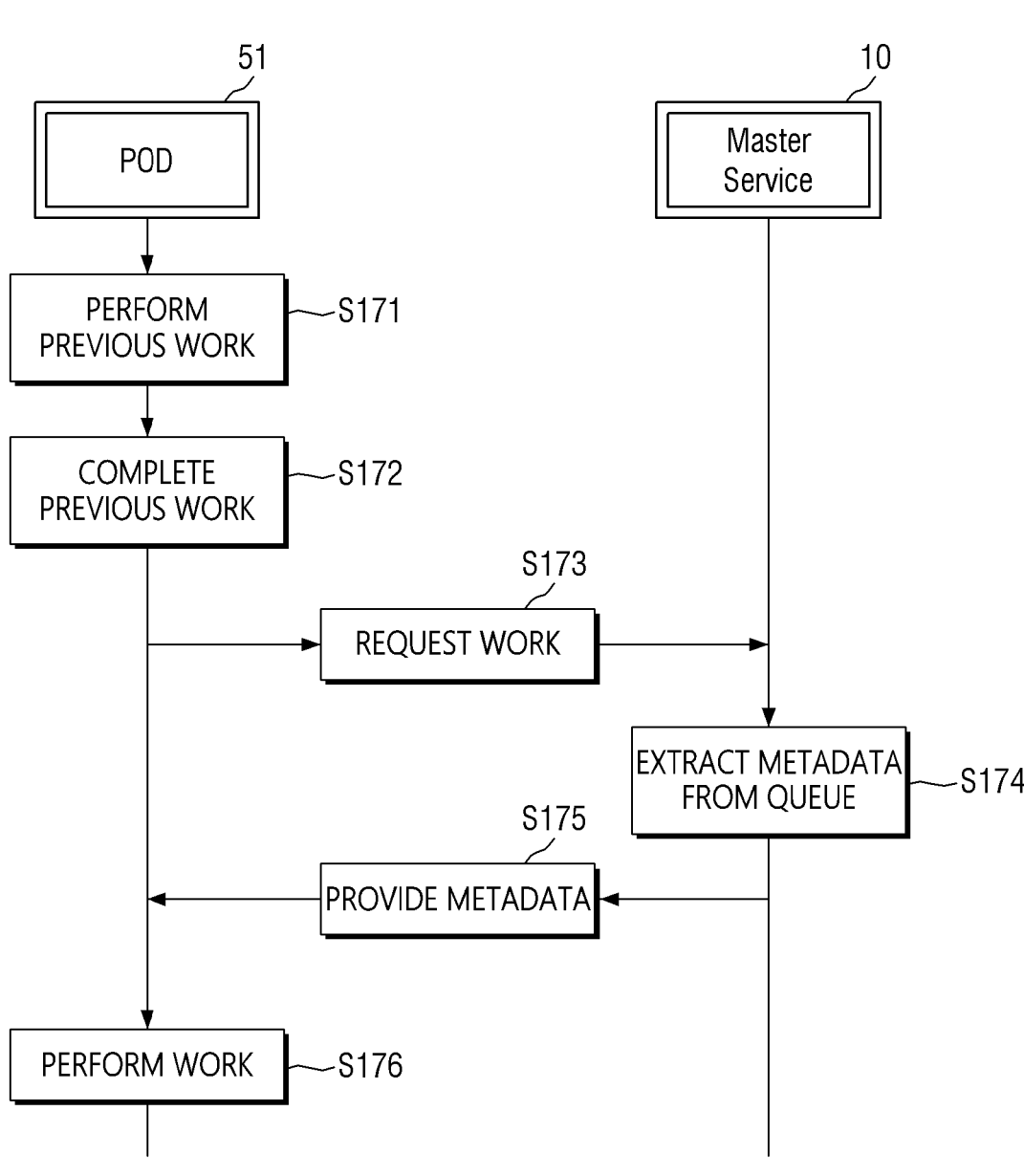
FIG. 5 is a diagram for explaining operations S150-S170 of FIG. 3 according to some embodiments of the disclosure.
Figure 6:
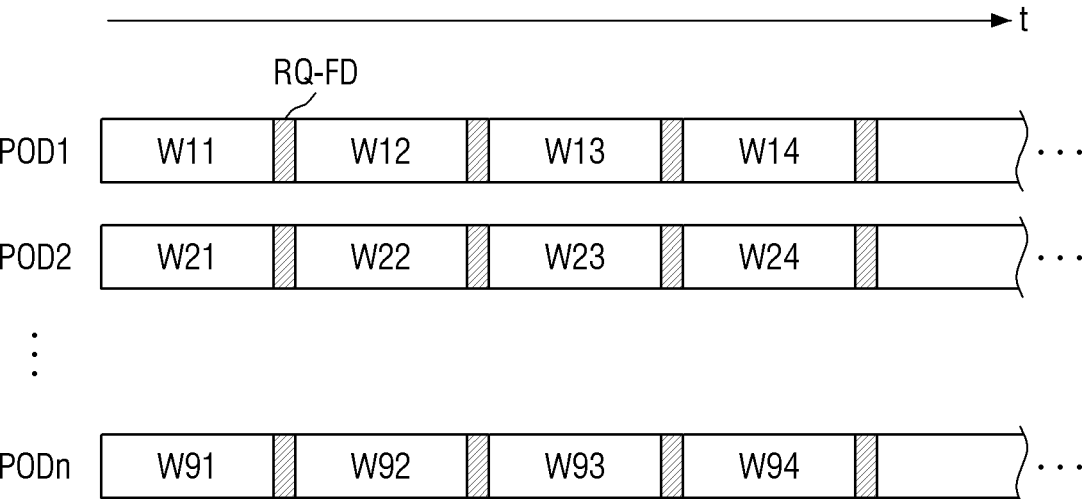
FIG. 6 is a diagram for explaining a method for distributed processing of data according to some embodiments of the disclosure.

FIG. 3 is a flow chart explaining a method for distributed processing of data according to some embodiments of the disclosure. FIG. 4 is a diagram for explaining operation S130 of FIG. 3 according to some embodiments of the disclosure. FIG. 5 is a diagram for explaining operations S150 to S170 of FIG. 3 according to some embodiments of the disclosure. FIG. 6 is a diagram for explaining a method for distributed processing of data according to some embodiments of the disclosure. For convenience of explanation, the explanation will be made mainly on points that are different from those explained using FIG. 1.

Referring to FIGS. 1 and 3, a plurality of raw data generated in the fabrication process are stored in the data storage 30 in real time (S110). Next, a plurality of pieces of information associated with each of the plurality of raw data are stored in the database 20 in real time (S120).

As described above, a plurality of raw data may be generated, for example, as measurement/inspection results, structural analysis results, and other imaging results. An inspection apparatus (or measurement inspection apparatus) generates a plurality of raw data and a plurality of pieces of information corresponding to the plurality of raw data. The generated raw data and information are stored in the data storage 30 and the database 20, respectively.

Next, the master service 10 monitors the database 20 on the basis of plurality of pieces of information, and selects the multiple processing targets to be processed among the plurality of raw data (S130).

Referring to FIG. 4, the master service 10 may search the plurality of pieces of information for each of the preset times (or for each cycle).

At time t1, the master service 10 searches the database 20 (S131). The master service 10 checks whether new information is uploaded to the database 20 after the previous monitoring time (S134). If new information is not added to the database 20 (NO at S134), the process ends, and if new information is added to the database 20 (YES at S134), the master service 10 generates metadata corresponding to the new information and stores it in the queue MQ (S138). The master service 10 may also select raw data corresponding to all kinds of information newly generated after the previous monitoring time as processing targets, and may select the raw data that match the particular conditions among the information newly generated after the previous cycle, as the processing target.

At time t2, the master service 10 searches the database 20 (S132). The master service 10 checks whether new information is uploaded to the database 20 between the previous monitoring time t1 and the current monitoring time t2 (S135). If new information is not added to the database 20 (NO at S135), the process ends, and if new information is added to the database 20 (YES at S135), the master service 10 generates metadata corresponding to the new information, and stores it in the queue MQ (S138).

At time t3, the master service 10 searches the database 20 (S133). The master service 10 checks whether new information is uploaded to the database 20 between the previous monitoring time t2 and the current monitoring time t3 (S136). If new information is not added to the database 20 (NO at S136), the process ends, and if new information is added to the database 20 (YES at S136), the master service 10 generates metadata corresponding to the new information, and stores it in the queue MQ (S138).

In this way, the master service 10 searches the database 20 according to a predetermined cycle (see times t1, t2 and t3).

Referring to FIG. 3 again, the master service 10 next stores a plurality of metadata associated with each of the plurality of processing targets in the queue MQ (S140).

The metadata stored in the queue MQ may be the same as or different from the information (e.g., the plurality of pieces of information) stored in the database 20. The metadata may include an operation (STEP_KEY) in which the raw data corresponding to the plurality of processing targets is generated, a lot number (LOT_KEY), a tracked-out time (TK-OUT_KEY), a substrate ID (WAFER_ID), an inspection time (INSP_TIME), an inspection type (ITEM ID, SUB ITEM ID), a number of raw data (image data) (IM-AGE_SEQ), a storage position of the image data (RAW_IMAGE_FILE_PATH) in the data storage 30, and the like.

When the pods 51-59 complete a previously assigned job and an idle state occurs, each pod may make a request for a job to the master service 10 (S150). Subsequently, the master service 10 provides the metadata stored in the queue MQ to each pod 51-59 that makes the request (S160). Subsequently, the pods 51-59 access the raw data stored in the data storage 30 using the metadata, and perform an assigned job (S170).

Referring to FIG. 5, the pod (e.g., pod 51) performs a previous job (S171), completes the previous job (S172), and enters an idle state.

After that, the pod 51 makes a request for a job to the master service 10 (S173).

Next, the master service 10 extracts the metadata from the queue MQ (S174). the master service 10 provides the metadata to the pod 51 (S175). That is, the master service 10 extracts the metadata of a preset batch size (e.g., sixteen) and provides it to the pod 51.

The pod 51 then accesses the raw data stored in the data storage 30 using the provided metadata, and performs the job on the raw data (S176).

On the other hand, referring to FIG. 6, each of the plurality of pods 51-59 makes a request for a job to the master service 10 upon completion of a previous job. Therefore, the plurality of pods 51-59 do not remain in an idle state for a long time.

As shown in FIG. 6, the pod POD1 sequentially performs a plurality of jobs W11, W12, W13, and W14. The pod POD2 sequentially performs a plurality of jobs W21, W22, W23, and W24. The pod POD3 sequentially performs a plurality of jobs W91, W92, W93, and W94. Operations (RQ-FD) in which the requests for jobs and metadata are provided are located between the jobs (e.g., W11, W12).

Each of the plurality of pods POD1-PODn may steadily perform jobs (W11-W14, W21-W24, and W91-W94) without a long idle state.

Figure 7:
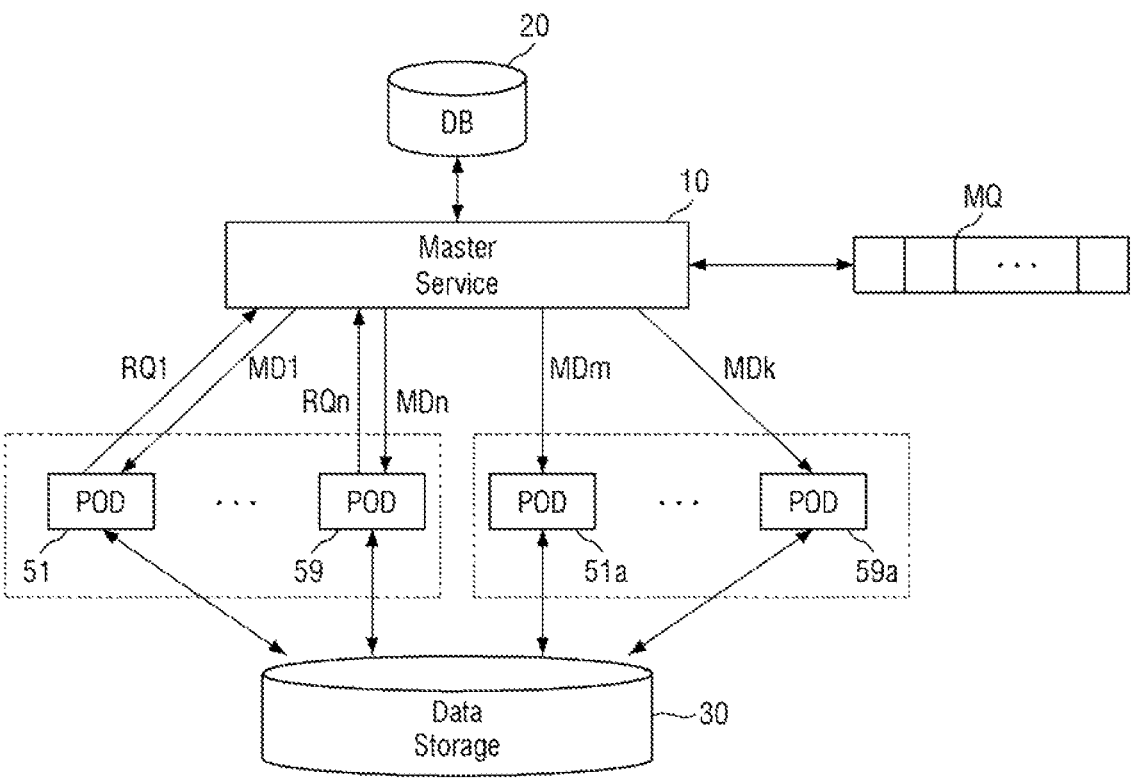
FIG. 7 is a block diagram for explaining a system for distributed processing of data according to some embodiments of the disclosure.

FIG. 7 is a block diagram for explaining a system for distributed processing of data according to some embodiments of the disclosure. For convenience of explanation, the explanation will be made mainly on points that are different from those explained using FIG. 1.

Referring to FIG. 7, a system for distributed processing of data according to some embodiments of the disclosure includes a data storage 30, a master service 20, a master service 10, a plurality of first pods (e.g., pods 51-59), a plurality of second pods (e.g., pods 51a-59a), a queue MQ, and the like.

The master service 10 monitors the database 20 on the basis of plurality of pieces of information and selects the multiple processing targets to be processed among the plurality of raw data stored in the data storage 30. The master service 10 stores a plurality of metadata associated with each of a plurality of processing targets in the queue MQ.

Each of the plurality of first pods 51-59 makes a request for a job (RQ1-RQn) to the master service 10 when entering the idle state, and receives the metadata (MD1-MDn) from the master service 10. The raw data stored in the data storage 30 is accessed using the provided metadata (MD1-MDn) to perform the job on the raw data.

Each of the plurality of second pods 51a-59a does not make a request for a job to the master service 10, even if there is an idle state. The master service 10 allocates one or more jobs (MDm-MDk) to the plurality of second pods 51a-59a through load balancing.

That is, the plurality of first pods 51-59 actively make the request for jobs (RQ1-RQn) to the master service 10, and the plurality of second pods 51a-59a passively wait for jobs allocation from the master service 10.

On the other hand, the plurality of first pods 51-59 may belong to a first data processing service, and the plurality of second pods 51a-59a may belong to a second data processing service.

The first data processing service and the second data processing service may perform a job of determining whether abnormal measurements occur in the image data measured in different fabrication processes from each other.

Requests for jobs for the pods 51-59 may be made depending on the job target (image data) or depending on the type of determination job, or a job may be allocated to the pods 51a-59a without a request for a job.

Figure 8:
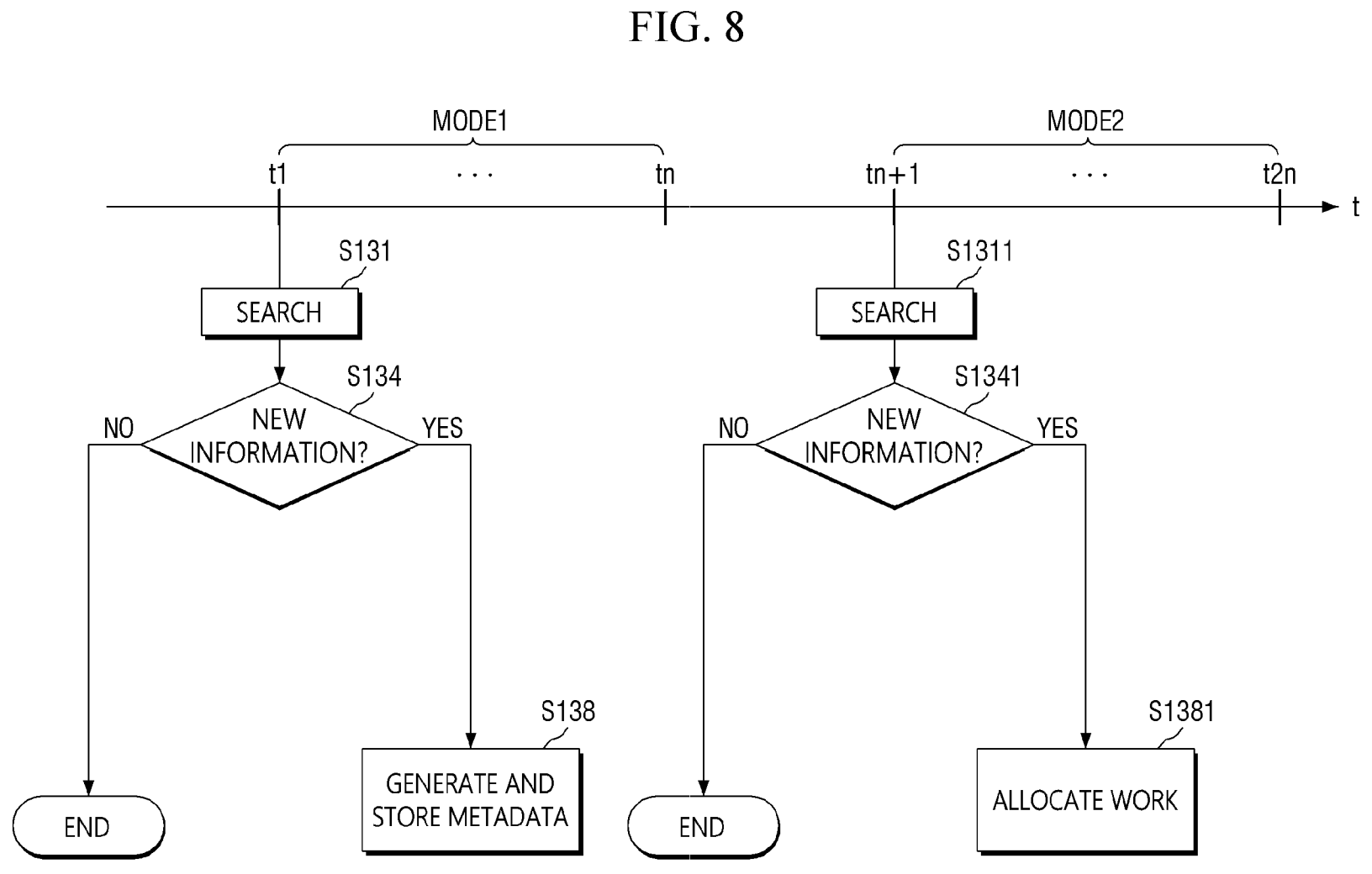

FIG. 8 is a block diagram for explaining a system for distributed processing of data according to some embodiments of the disclosure. For convenience of explanation, the explanation will focus on points different from those explained using FIG. 4.

Referring to FIG. 8, the system for distributed processing of data according to another embodiment of the disclosure may operate in a first mode (MODE1) and a second mode (MODE2) different from each other. For example, the system may operate in the first mode (MODE1) from time t1 to time tn, and operate in the second mode (MODE2) from time $t_{n+1}$ to time $t_{2n}$.

From time t1 to time tn, the master service 10 searches a plurality of pieces of information in the database 20 for each preset time (or for each cycle) (S131).

The master service 10 checks whether new information is uploaded to the database 20 after the previous monitoring time (S134). If new information is not added to the database 20 (NO at S134), the process ends, and if new information is added to the database (YES at S134), the master service 10 generates metadata corresponding to the new information, and stores it in the queue MQ (S138). When the pods 51-59 of the idle state makes a request for a job, the master service 10 provides the metadata stored in the queue MQ to the pods 51-59 that make the request for the job.

From time $t_{n+1}$ to time $t_{2n}$, the master service 10 searches a plurality of pieces of information in the database 20 for each preset time (or for each cycle) (S1311).

The master service 10 checks whether new information is uploaded to the database 20 after the previous monitoring time (S1341). If new information is not added to the database 20 (NO at S1341), the process ends, and if new information is added to the database 20 (YES at S1341), the master service 10 immediately allocates the jobs to the pods 51-59 of the idle state (S1381).

The master service 10 may allocate the jobs by providing information stored in database 20 to the pods 51-59, but is not limited thereto.

Figure 9:
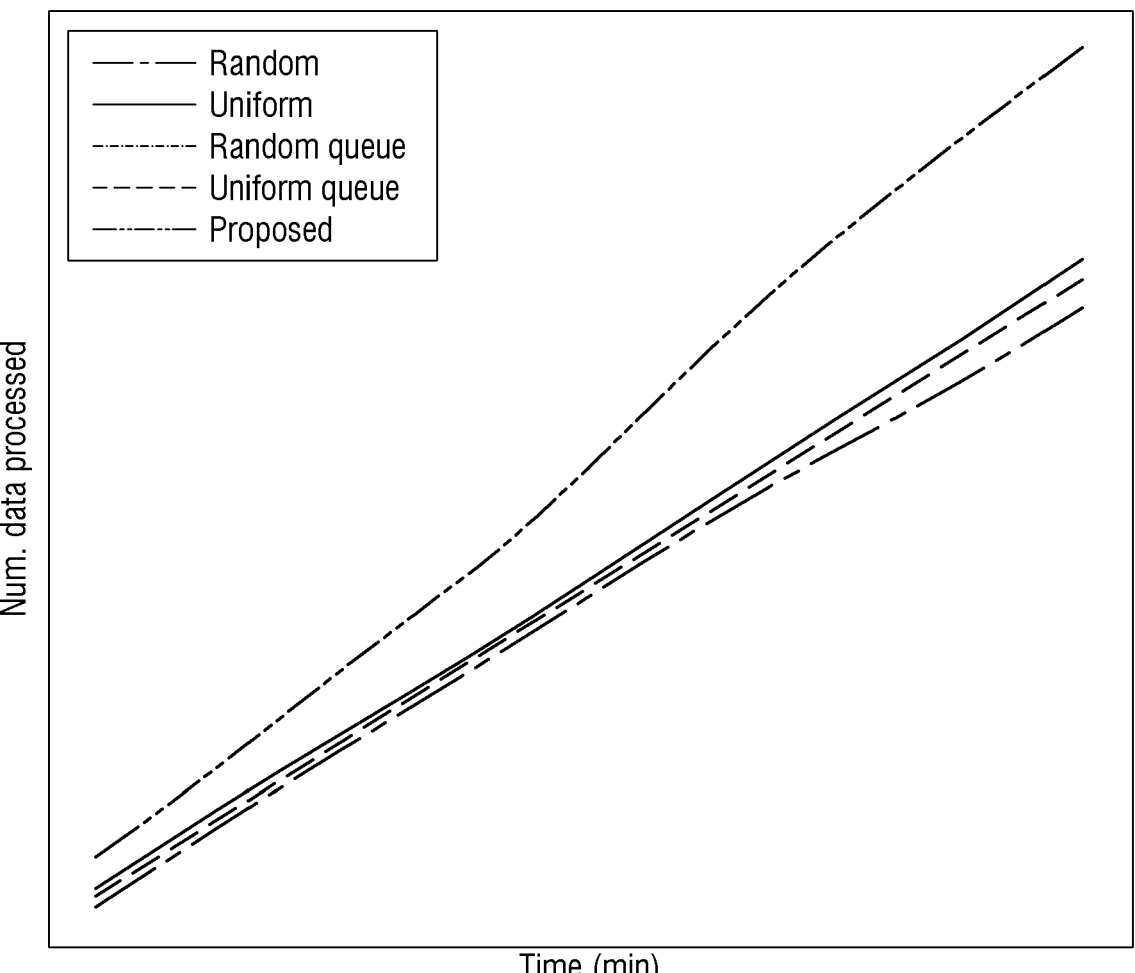
FIG. 9 is a diagram for explaining the effect of a system for distributed processing of data according to some embodiments of the disclosure.
Figure 10:
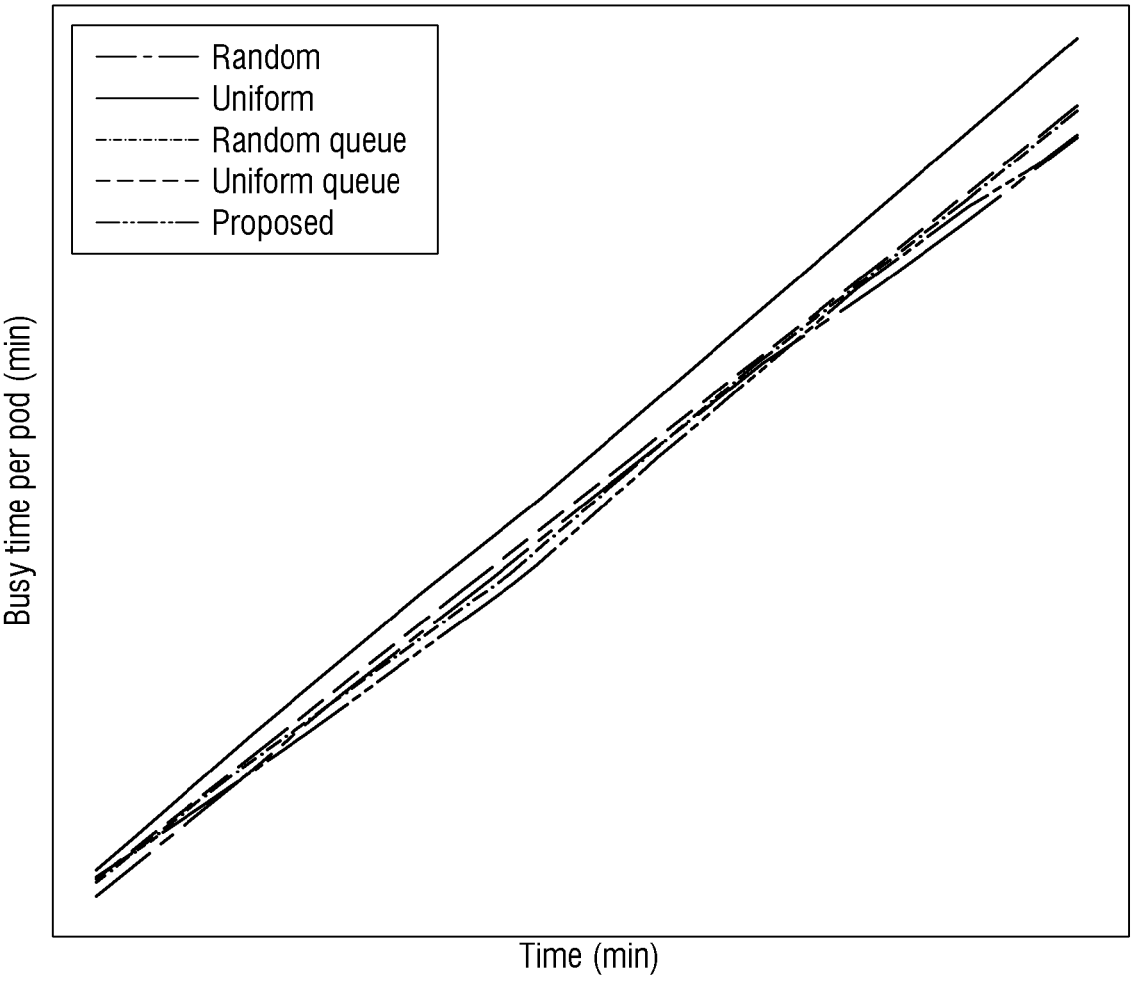
FIG. 10 is a diagram for explaining the effect of the system for distributed processing of data according to some embodiments of the disclosure.

FIGS. 9 and 10 are diagrams for explaining the effects of a system for distributed processing of data according to some embodiments of the disclosure. Specifically, FIGS. 9 and 10 show the results of a data processing capability test for data (e.g., image data) generated on average 130 sheets per minute (e.g., 7,800 sheets per hour, 187,200 sheets per day). When the data is generated uniformly, 130 sheets are generated at a constant cycle, and when the data is randomly generated, 130 sheets are generated on the basis of the average per minute. FIG. 9 is a diagram for explaining data throughput over time according to some embodiments, and FIG. 10 is a diagram for explaining the busy time (operating time) per pod over time according to some embodiments.

Referring to the legend in FIGS. 9 and 10, "Random" refers to an environment in which data is randomly generated, "Uniform" refers to an environment in which data is uniformly generated, and "queue" refers to an environment in which generated data are loaded into a queue and distributed to pods by equal numbers. Thus, "Random queue" refers to an environment in which generated data are loaded into a queue and distributed to a pod in the environment in which the data are randomly generated; and "Uniform queue" refers to an environment in which the generated data are loaded into the queue and distributed to pods in the environment in which data is uniformly generated. "Proposed" refers to a system for distributed processing of data according to some embodiments of the disclosure.

Referring to FIG. 9, "Time" represents an x-axis, and "Num. data processed" represents a y-axis. As can be seen based on the results corresponding to the related art ("Random", "Uniform", "Random queue", "Uniform queue"), 5,500 sheets were processed per hour, but all data (7,800 sheets per hour) could not be processed. As can be seen based on the results corresponding to an embodiment of the disclosure ("Proposed"), all data could be processed in real time.

Referring to FIG. 10, "Time" represents an x-axis, and "Busy time per pod" represents a y-axis. Here, "Busy time per pod" means operating time per pod (e.g., time not in an idle state). As can be seen based on the results corresponding to an embodiment of the disclosure ("Proposed"), the operating time per pod is less (more idle time) compared to the results corresponding to the related art. This indicates that the embodiment of the disclosure is able to process more data.

Those skilled in the art will appreciate that many variations and modifications may be made to the example embodiments without substantially departing from the principles of the disclosure. Therefore, the various embodiments of the disclosure are used in a generic and descriptive sense only and not for purposes of limitation.

What is claimed is:

1. A system for real-time distributed processing of fabrication data, comprising:
   memory configured to store a plurality of raw data generated in a fabrication process in real time;

database configured to store a plurality of pieces of information associated with the plurality of raw data in real time;
   at least one first processor implementing a master service configured to:
      monitor the database,
      select a plurality of processing targets to be processed among the plurality of raw data based on the plurality of pieces of information,
      store a plurality of metadata associated with the plurality of processing targets in a queue, and
      allocate metadata from the plurality of metadata to a pod in response to a request from the pod; and
   at least one second processor implementing a plurality of pods, each pod configured to:
      request a job determining whether there is an abnormal measurement in the raw data for execution from the master service,
      receive the allocated metadata from the master service corresponding to a processing target in the queue,
      access the raw data among the plurality of raw data in the memory based on the allocated metadata, and
      execute the job of determining whether there is an abnormal measurement associated with the raw data using a machine learning model.

2. The system of claim 1, wherein each of the plurality of pods is configured to request the job from the master service, based on entering an idle state after completing a previous job.

3. The system of claim 2, wherein each of the plurality of pods is configured to operate in a keep-alive state.

4. The system of claim 1, wherein the master service is further configured to:
   monitor the database at a preset time, detect newly generated information after a previous monitoring time, and select the plurality of processing targets based on the newly generated information.

5. The system of claim 1, wherein, based on the master service receiving the request for the job from a pod among the plurality of pods, the master service is configured to provide the allocated metadata of a preset batch size to the pod from which the request for the job was received.

6. The system of claim 1, wherein the allocated metadata includes at least one of an operation in which image data corresponding to the processing target is generated, a lot number, a track-out time, a substrate identifier (ID), an inspection type, one or more image data among the plurality of raw data corresponding to the allocated metadata, and a storage position of the one or more image data.

7. The system of claim 1, wherein the plurality of raw data includes image data measured in the fabrication process, and each of the plurality of pods is configured to perform the job of determining whether there is an abnormal measurement on the image data, using the machine learning model.

8. The system of claim 7, wherein the job of determining whether there is an abnormal measurement comprises:
   determining whether the image data is generated by the abnormal measurement or whether the image data is generated by a normal measurement but deviates from specification.

9. The system of claim 6, further comprising:
   at least one third processor implementing a plurality of data processing services, each data processing service including at least one of the plurality of pods,
   wherein each of the plurality of data processing services is configured to perform the job of determining whether there is an abnormal measurement on the image data measured in different fabrication processes from each other.

10. The system of claim 1, further comprising:

at least one fourth processor implementing a plurality of second pods, each pod of the plurality of second pods configured to enter an idle state without requesting the job to the master service, wherein the master service is further configured to allocate a job to the second pod among the plurality of second pods through load balancing.

11. A system for real-time distributed processing of fabrication data, comprising:

memory configured to store a plurality of image data generated in a fabrication process in real time;

a database configured to store a plurality of pieces of information associated with the plurality of image data in real time;

at least one first processor implementing a master service configured to:

monitor the database at a preset time, detect newly generated information after a previous monitoring time, select image data corresponding to the newly generated information as a processing target, store metadata associated with the processing target in a queue, and allocate metadata from the metadata associated with the processing target in the queue to a pod in response to a request from the pod; and at least one second processor implementing a plurality of pods, each pod configured to:

operate in a keep-alive state in which a connection with the master service is kept alive, wherein each pod is configured to request a job determining whether there is an abnormal measurement in raw data for execution from the master service and receive allocated metadata from the master service, based on completing a previous job and entering an idle state, and wherein each pod is configured to access the image data stored in the memory based on the allocated metadata, and wherein each pod is configured to execute the job of determining whether there is an abnormal measurement associated with the raw data using a machine learning model.

12. The system of claim 11, wherein based on receiving the request for the job from the pod, the master service is configured to provide the allocated metadata of a preset batch size to the pod which makes the request for the job.

13. The system of claim 11, wherein the allocated metadata includes at least one of an operation in which corresponding image data is generated, a lot number, a track-out time, a substrate ID, an inspection type, a number of the corresponding image data, and a storage position of the corresponding image data.

14. The system of claim 11, wherein the job of determining whether there is an abnormal measurement on the image data comprises:

determining whether the plurality of image data is generated by the abnormal measurement or whether the plurality of image data is generated by a normal measurement but deviates from a specification.

15. The system of claim 11, further comprising:

at least one third processor implementing a plurality of data processing services, each of the plurality of data processing services comprising at least one pod among the plurality of pods, wherein each of the plurality of data processing services is configured to perform a job of determining whether there is an abnormal measurement on the image data measured in different fabrication processes from each other.

16. The system of claim 11, further comprising:

at least one fourth processor implementing a plurality of second pods, each of the plurality of second pods configured not to request the job to the master service, wherein the master service is further configured to allocate a the job to one or more of the plurality of second pods through load balancing.

17. A method for real-time distributed processing of fabrication data, the method being executed by one or more processor, collectively or individually, the method comprising:

storing a plurality of raw data generated in a fabrication process, in a memory in real time;

storing a plurality of pieces of information associated with the plurality of raw data in a database in real time;

selecting a plurality of processing targets to be processed among the plurality of raw data, based on the plurality of pieces of information;

storing metadata associated with each of the plurality of processing targets in a queue;

receiving a request for executing a job of determining whether there is an abnormal measurement in the raw data from a pod, based on the pod having completed a previous job and an idle state; and providing the metadata stored in the queue to the pod to execute the job of determining whether there is an abnormal measurement in the raw data based on accessing the plurality of processing targets in the memory.

18. The method of claim 17, wherein the pod operates in a keep-alive state in which a connection for receiving the request for the job from the pod and providing the metadata to the pod is kept alive after the request is received and the metadata is provided.

19. The method of claim 17, wherein the method further comprises:

monitoring the database at a preset time;

detecting newly generated information after a previous monitoring time; and selecting the raw data corresponding to the newly generated information as one of the plurality of processing targets.

20. The method of claim 17, wherein based on receiving the request for the job from the pod, providing the metadata of a preset batch size to the pod.

* * * * *